A. P. DAVEY.
TARGET TRAP.
APPLICATION FILED SEPT. 5, 1912.
1,071,512.
Patented Aug. 26, 1913.
2 SHEETS—SHEET 1.
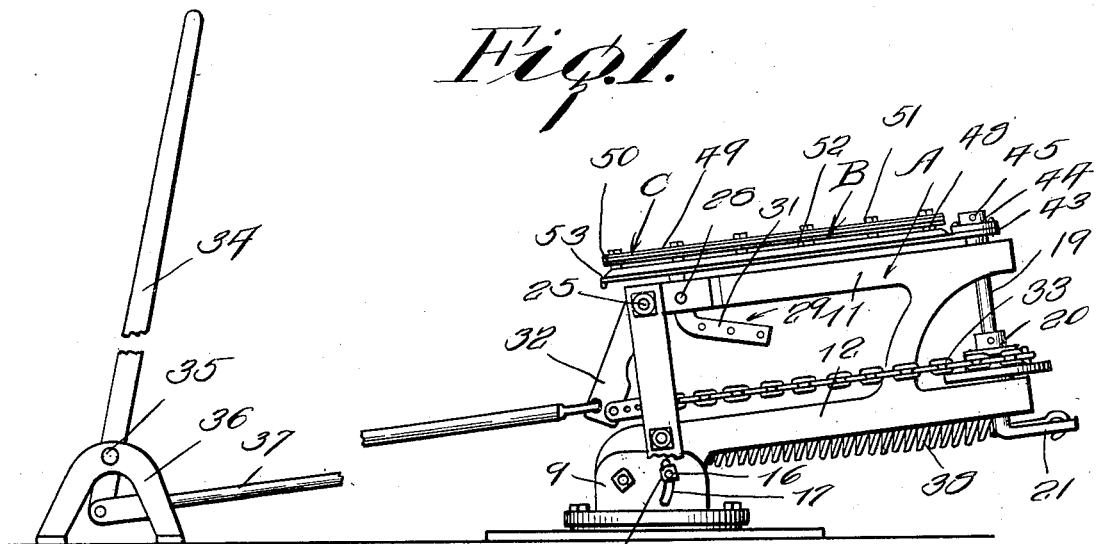
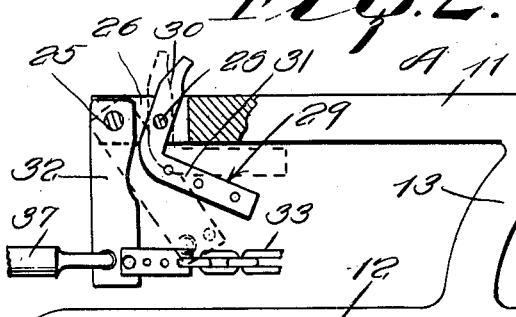
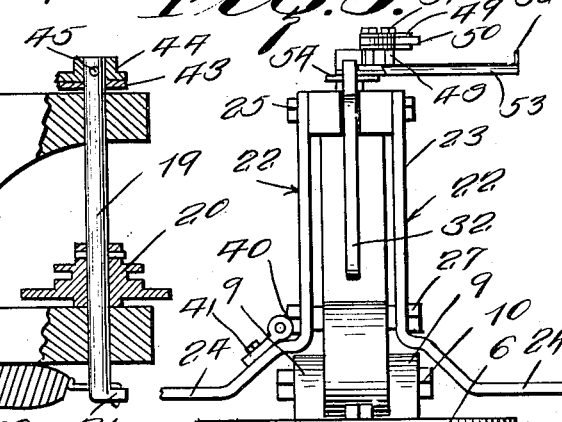
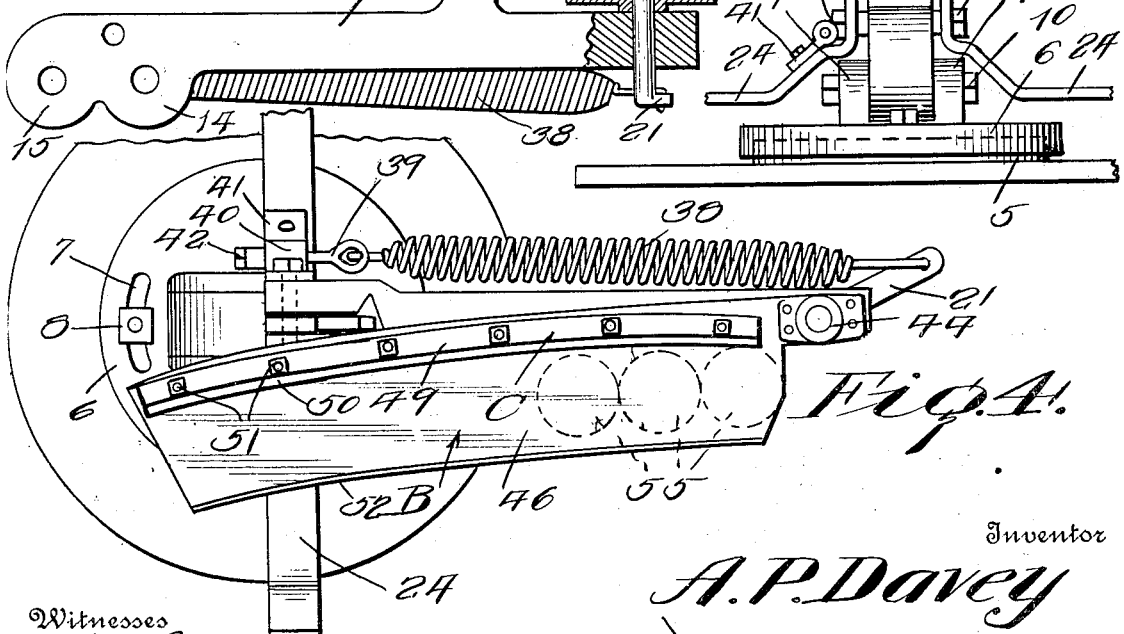
Witnesses
B. S. Brann
George Sato
Inventor
A. P. Davey
By Ormaled Chandler
Attorney

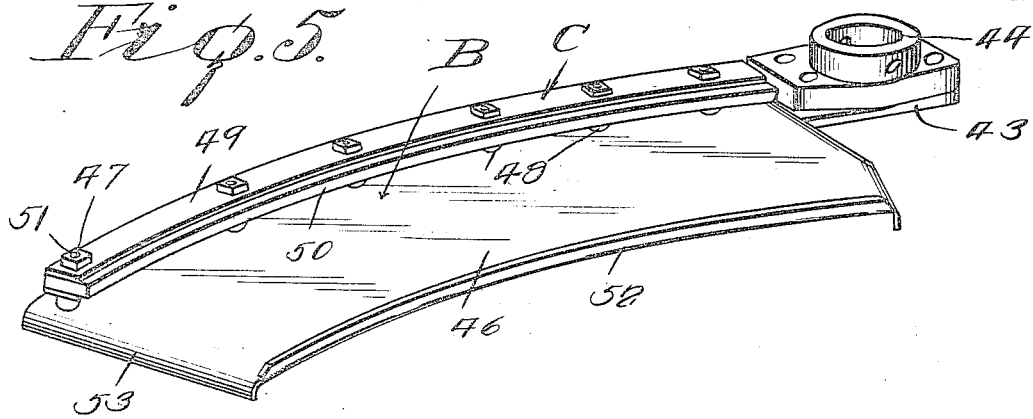
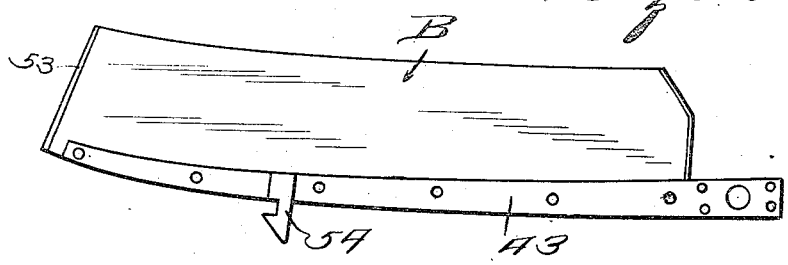
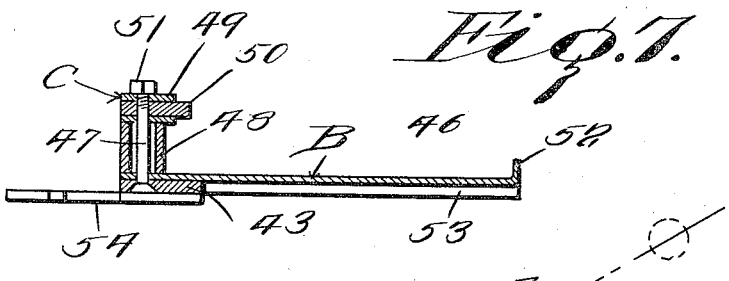
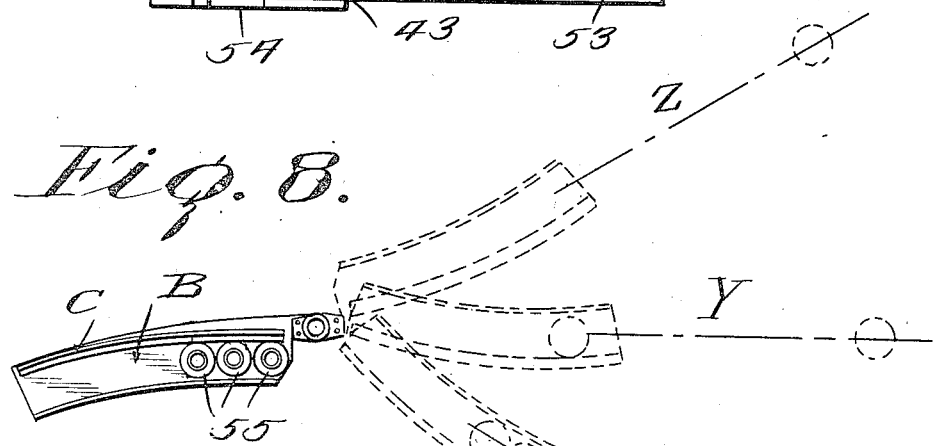

UNITED STATES PATENT OFFICE.

ARCHIE P. DAVEY, OF YORK, PENNSYLVANIA.

TARGET-TRAP.

1,071,512. Specification of Letters Patent. Patented Aug. 26, 1913.

Application filed September 5, 1912. Serial No. 718,720.

*To all whom it may concern:*

Be it known that I, ARCHIE P. DAVEY, a citizen of the United States, residing at York, in the county of York, State of Pennsylvania, have invented certain new and useful Improvements in Target-Traps; and I do hereby declare the following to be a full, clear, and exact description of the invention, such as will enable others skilled in the art to which it appertains to make and use the same.

This invention relates to new and useful improvements in target traps.

The principal object of the invention is to provide a target trap by means of which a plurality of pigeons may be discharged at different horizontal angles in rapid succession.

Another object of the invention is to provide a target trap by means of which a single pigeon may be discharged at any predetermined horizontal angle.

A further object of the invention is to provide a trap of the character described by means of which the pigeons may be discharged at different horizontal angles and also at any predetermined inclination.

A still further object of the invention is to provide a target trap of the character described which is composed of a minimum number of parts, is therefore simple in construction, is capable of being readily and easily operated and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a side elevation of a trap constructed in accordance with my invention, the view showing the trap in its set position, Fig. 2 is an enlarged detail longitudinal sectional view through the frame of the trap, parts thereof being shown in elevation, Fig. 3 is a rear end view of the trap, Fig. 4 is a top plan view thereof, Fig. 5 is a perspective view of the throwing arm, Fig. 6 is a bottom plan view thereof, Fig. 7 is a detail cross sectional view of the arm, and Fig. 8 is a diagrammatic view showing the relative positions of the pigeons as they are discharged from the throwing arm.

Like reference numerals designate corresponding parts in all the figures of the drawings.

Referring to the drawings, 5 designates a base and upon this base is rotatably mounted a cap 6. This cap is formed with an arcuate slot 7, and a bolt 8 which is bent upwardly from the base 5 passes through said slot and serves to limit the rotation of the cap. Extending upwardly from the cap 6 is a pair of spaced ears 9—9 which support a horizontal pivot bolt 10.

A frame A is formed from a single casting and includes spaced upper and lower horizontal arms 11 and 12 respectively which are centrally connected by a web 13. The rear end of the lower arm 12 is formed with a pair of front and rear depending ears 14 and 15 respectively, the latter being disposed between the ears 9 and having pivotal connection with the bolt 10. The front ear 14 is formed with a suitable opening through which passes a locking bolt 16, said bolt also passing through arcuate slots 17 formed in the ears 9 in advance of the pivot bolt 10. A nut 18 is associated with one end of the bolt 16 and serves to lock the frame A in any adjusted angle.

A vertically disposed crank shaft 19 is journaled in suitable openings formed in the forward ends of the arms 11 and 12, and fixed on this shaft intermediate said arms is a sprocket gear 20. The lower end of the shaft 19 below the lower arm 12 terminates in a crank arm 21.

An opposed pair of foot levers 22—22 are arranged on opposite sides of the frame A and at the rear end thereof. Each lever is preferably formed from a length of strap metal and includes a body portion 23 and a laterally extending foot 24 at its lower end. A bolt 25 passes through the upper ends of the body portions 23 and through the rear end of the upper arm 11 of said frame, said bolt also passing through a vertical longitudinal slot 26 which extends inwardly from the rear end of said arm 11. A bolt 27 passes through the lower portions of said body portions 23 and through the rear end of the lower arm 12.

Carried by the upper arm 11 and extending through the slot 26 in advance of the bolt 25 is a pivot bolt 28. A bell crank shaped latch 29 has one arm 30 disposed in the slot 26 and is centrally fulcrumed upon the pivot 28, the other arm 31 normally extending downwardly and forwardly. Pivoted upon the bolt 25 and within the slot 26 is one end of a latch actuating lever 32. A chain 33 has one end connected to the sprocket wheel 20 and has its other end connected to the lower end of the lever 32. A hand lever 34 is fulcrumed intermediate its ends, as at 35, upon the bracket 36, and a rod 37 is pivotally connected at one end to the lower end of the lever 34 and at its other end to the lower end of the lever 32. A coil spring 38 is connected at one end to the crank arm 21 of the crank shaft 19, and has its other end connected to an eye-bolt 39. This eye-bolt has its threaded shank extending through an eye 40 formed on a clip 41 which is secured to one of the foot levers 22. A nut 42 is associated with the rear ends of the eye bolt 39 and serves to adjust the tension of the spring 38.

My invention further comprises a throwing arm which is designated as a whole by the reference letter B. This arm consists of a supporting arm 43 which is formed at one end with an enlarged bearing 44 for receiving the upper end of the crank shaft 19, said arm being fixedly secured to the shaft by means of a transverse locking pin 45. This supporting arm 43 is disposed below one longitudinal edge of a tray 46 which is formed from sheet metal. A plurality of bolts 47 extend upwardly through the arm 43 and tray 46 and disposed around each bolt is a spacing sleeve 48, said sleeves serving to space an arcuate track C above the tray 46.

The track C consists of a pair of spaced upper and lower arcuate plates 49, and disposed between these plates is a strip of hard rubber or other cushioning material 50, one of the longitudinal edges thereof projecting beyond the plates and over the tray 46. The bolts 47 extend through suitable openings formed in the plates 49 and the cushioning material 50 and a nut 51 is associated with the upper end of each bolt and serves to lock the supporting arm 43, tray 46, sleeve 48 and track C together so as to form a unitary structure. The curve of the track C is gradually increased from its inner end to a point at about the center and thence terminates in a greater curve. The longitudinal edge of the tray 46 opposite the track C is bent to form an upwardly extending longitudinal flange 52, and the opposite ends of said tray are respectively bent to form downwardly extending curved flanges 53. Centrally secured to the underface of the supporting arm 43 and projecting laterally in a direction opposite the tray 46 is a hook 54 which is adapted when the throwing arm B is disposed in its set position as clearly shown in Fig. 4, to have locking engagement with the upper end of the arm 30 of the latch 29.

In practice, the throwing arm B is locked in its set position as clearly shown in Fig. 4 of the drawings, and it will be observed that in this position the coil spring 38 is extended so that upon release of the hook 54 of the arm, said arm will be caused to swing rapidly in a horizontal plane. When it is desired to discharge three targets or pigeons 55, said pigeons are positioned upon the tray 46 against the track C and at the inner end of said tray. These pigeons are arranged close to each other and bear against the cushioning material 50 of said track. The hand lever 34 is then swung rearwardly and as a result the rod 37 swings the latch lever 32 forwardly to engage the latch 29. This movement of the lever 32 releases the arm 30 of said latch from its engagement with the hook 54 of the throwing arm B. The coil spring 38 then contracts and through the medium of the crank arm 21 and crank shaft 19, the throwing arm B is swung rapidly in a horizontal plane. As the arm is thus moved, the chain 33 is wound around the sprocket wheel 20. When the throwing arm B reaches the angle marked X in Fig. 8 of the drawing the first pigeon is discharged. As the throwing arm B further rotates the remaining two pigeons move forwardly until the arm reaches the position marked Y in Fig. 8. In this position the second or intermediate pigeon is discharged directly in front of the track. As the throwing arm B further rotates the last pigeon moves forwardly until the arm reaches the position marked Z in Fig. 8. In this position the last pigeon is discharged in an opposite direction but at the same angle as the first pigeon. It will thus be observed that the pigeons are discharged at different horizontal angles in rapid succession.

When it is desired to discharge the pigeons at any predetermined inclination, the main frame A is adjusted upon its pivot bolt 10 and held in that adjusted position by the bolt 16 and nut 18.

In order to reset the trap, the hand lever 34 is moved forwardly and as a result, the rod 37 will swing the latch lever 32 rearwardly away from the latch 29, and at the same time will unwind the chain 33 from the sprocket wheel 20. This movement will cause the crank shaft 19 to be rotated and as a result the spring 38 will be stretched and the throwing arm B returned to its initial position, and locked in said position through the medium of the hook 54 and latch 29.

What is claimed is:

In a target trap, a swinging elongated flat plate, spaced longitudinal arcuate flanges extending from end to end of said plate and adapted to loosely confine a row of contiguous targets on said plate, one of said flanges having a portion adapted to overhang the adjacent edges of the row of targets and retain the latter against vertical escape, and means for actuating said plate whereby to discharge the targets therefrom at different angles in succession.

In testimony whereof, I affix my signature, in the presence of two witnesses.

ARCHIE P. DAVEY.

Witnesses:
　FRANCIS BOYLE,
　GEORGE TATE.